(12) United States Patent
Park et al.

(10) Patent No.: US 9,749,910 B2
(45) Date of Patent: Aug. 29, 2017

(54) METHOD AND APPARATUS FOR TRANSMITTING USER EQUIPMENT GROUP INFORMATION IN WIRELESS COMMUNICATION SYSTEM

(71) Applicant: LG ELECTRONICS INC., Seoul (KR)

(72) Inventors: Kyungmin Park, Seoul (KR); Insun Lee, Seoul (KR); Daewook Byun, Seoul (KR); Jian Xu, Seoul (KR)

(73) Assignee: LG ELECTRONICS, Seoul (KR)

( * ) Notice: Subject to any disclaimer, the term of this patent is extended or adjusted under 35 U.S.C. 154(b) by 234 days.

(21) Appl. No.: 14/334,358

(22) Filed: Jul. 17, 2014

(65) Prior Publication Data

US 2015/0023319 A1    Jan. 22, 2015

Related U.S. Application Data

(60) Provisional application No. 61/856,076, filed on Jul. 19, 2013, provisional application No. 61/862,968, filed on Aug. 7, 2013.

(51) Int. Cl.
*H04W 36/16* (2009.01)
*H04W 36/00* (2009.01)
*H04W 36/24* (2009.01)
*H04W 36/38* (2009.01)
*H04W 36/08* (2009.01)

(52) U.S. Cl.
CPC ..... *H04W 36/0055* (2013.01); *H04W 36/165* (2013.01); *H04W 36/245* (2013.01); *H04W 36/38* (2013.01); *H04W 36/0083* (2013.01); *H04W 36/08* (2013.01)

(58) Field of Classification Search
CPC .......................... H04W 36/0011; H04W 36/165
See application file for complete search history.

(56) References Cited

U.S. PATENT DOCUMENTS

| 2008/0119182 A1* | 5/2008 | Kwun ............... | H04W 36/0083 455/424 |
| 2009/0122763 A1* | 5/2009 | Oguchi ............. | H04W 36/34 370/331 |
| 2010/0142486 A1* | 6/2010 | Wahlqvist ......... | H04W 72/0406 370/332 |

(Continued)

FOREIGN PATENT DOCUMENTS

WO    WO2013/020604 A1 *    2/2013    ............ H04W 36/24

OTHER PUBLICATIONS

3GPP TS 36.423 v11.5.0 (Jun. 2013), Techncial Specification Group Radio Access Network; Evolved Universal Terrestrial Radio Access Network (E-UTRA); X2 application protocol (X2AP) (Release 11, Jun. 2013, 144 pages.*

*Primary Examiner* — Hoon J Chung
(74) *Attorney, Agent, or Firm* — Lee Hong Degerman Kang & Waimey

(57) ABSTRACT

A method and apparatus for transmitting user equipment (UE) group information in a wireless communication system is provided. A source eNodeB (eNB) of a handover procedure transmits a handover request message including UE group information to a target eNB of the handover procedure when the source eNB hands over a UE to the target eNB. The UE group information is included in a UE history information IE (information element) of the handover request message.

17 Claims, 10 Drawing Sheets

(56) References Cited

U.S. PATENT DOCUMENTS

| | | | |
|---|---|---|---|
| 2010/0173634 A1* | 7/2010 | Kato | H04W 36/0055 |
| | | | 455/438 |
| 2010/0178922 A1* | 7/2010 | Han | H04W 36/245 |
| | | | 455/436 |
| 2010/0272050 A1* | 10/2010 | Lim | H04W 8/22 |
| | | | 370/329 |
| 2012/0077502 A1* | 3/2012 | Liu | H04W 36/245 |
| | | | 455/438 |
| 2013/0225171 A1* | 8/2013 | Singh | H04W 36/245 |
| | | | 455/436 |
| 2013/0316713 A1* | 11/2013 | Xu | H04W 36/32 |
| | | | 455/438 |
| 2013/0337815 A1* | 12/2013 | Sebire | H04W 36/0055 |
| | | | 455/438 |
| 2015/0296426 A1* | 10/2015 | Mildh | H04W 36/0055 |
| | | | 455/436 |

* cited by examiner (a)

(b)

METHOD AND APPARATUS FOR TRANSMITTING USER EQUIPMENT GROUP INFORMATION IN WIRELESS COMMUNICATION SYSTEM

CROSS-REFERENCE TO RELATED APPLICATIONS

Pursuant to 35 U.S.C. §119(e), this application claims the benefit of U.S. Provisional Patent Application Nos. 61/856,076, filed on Jul. 19, 2013, and 61/862,968, filed on Aug. 7, 2013, the contents of which are all hereby incorporated by reference herein in their entirety.

BACKGROUND OF THE INVENTION

Field of the Invention

The present invention relates to wireless communications, and more particularly, to a method and apparatus for transmitting user equipment group information in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20. The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a block diagram of a user plane protocol stack and a control plane protocol stack of an LTE system. FIG. 3-(a) shows a block diagram of a user plane protocol stack of an LTE system, and FIG. 3-(b) shows a block diagram of a control plane protocol stack of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 3-(a), the RLC and MAC layers (terminated in the eNB on the network side) may perform functions such as scheduling, automatic repeat request (ARQ), and hybrid automatic repeat request (HARQ). The PDCP layer (terminated in the eNB on the network side) may perform the user plane functions such as header compression, integrity protection, and ciphering.

Referring to FIG. 3-(b), the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

It is known that different cause values may be mapped o the signature sequence used to transmit messages between a UE and eNB and that either channel quality indicator (CQI) or path loss and cause or message size are candidates for inclusion in the initial preamble.

When a UE wishes to access the network and determines a message to be transmitted, the message may be linked to a purpose and a cause value may be determined The size of the ideal message may be also be determined by identifying all optional information and different alternative sizes, such as by removing optional information, or an alternative scheduling request message may be used.

The UE acquires necessary information for the transmission of the preamble, UL interference, pilot transmit power and required signal-to-noise ratio (SNR) for the preamble detection at the receiver or combinations thereof This information must allow the calculation of the initial transmit power of the preamble. It is beneficial to transmit the UL message in the vicinity of the preamble from a frequency point of view in order to ensure that the same channel is used for the transmission of the message.

The UE should take into account the UL interference and the UL path loss in order to ensure that the network receives the preamble with a minimum SNR. The UL interference can be determined only in the eNB, and therefore, must be broadcast by the eNB and received by the UE prior to the transmission of the preamble. The UL path loss can be considered to be similar to the DL path loss and can be estimated by the UE from the received RX signal strength when the transmit power of some pilot sequence of the cell is known to the UE.

The required UL SNR for the detection of the preamble would typically depend on the eNB configuration, such as a number of Rx antennas and receiver performance. There may be advantages to transmit the rather static transmit power of the pilot and the necessary UL SNR separately from the varying UL interference and possibly the power offset required between the preamble and the message.

The initial transmission power of the preamble can be roughly calculated according to the following formula:

Transmit power=TransmitPilot−RxPilot+
ULInterference+Offset+SNRRequired

Therefore, any combination of SNRRequired, ULInterference, TransmitPilot and Offset can be broadcast. In principle, only one value must be broadcast. This is essentially in current UMTS systems, although the UL interference in 3GPP LTE will mainly be neighboring cell interference that is probably more constant than in UMTS system.

The UE determines the initial UL transit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power of the preamble is not adequate. Another preamble will most likely be transmitted if no ACK or NACK is received by the UE before the next random access attempt. The transmit power of the preamble can be increased, and/or the preamble can be transmitted on a different UL frequency in order to increase the probability of detection. Therefore, the actual transmit power of the preamble that will be detected does not necessarily correspond to the initial transmit power of the preamble as initially calculated by the UE.

The UE must determine the possible UL transport format. The transport format, which may include MCS and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the EU since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the EU according to the received preamble because the UE transmit power compared to the maximum allowed or possible UE transmit power is not known to the eNB, given that the UE will most likely consider the measured path loss in the DL or some equivalent measure for the determination of the initial preamble transmission power.

The eNB could calculate a difference between the path loss estimated in the DL compared and the path loss of the UL. However, this calculation is not possible if power ramping is used and the UE transmit power for the preamble does not correspond to the initially calculated UE transmit power. Furthermore, the precision of the actual UE transmit power and the transmit power at which the UE is intended to transmit is very low. Therefore, it has been proposed to code the path loss or CQI estimation of the downlink and the message size or the cause value in the UL in the signature.

Self-organizing networks (SON) enhancements are necessary for the interoperability of the existing features as well as for the new features and new deployments considered in 3GP LTE rel-12. In 3GPP LTE rel-11, mobility robustness optimization (MRO) has been enhanced to identify for which UE type the failure has occurred. Other SON use cases might require similar enhancements. For example, mobility load balancing (MLB) is not able to distinguish between UEs that support cell range expansion (CRE) and non-CRE UEs.

In order to improve MLB and MRO functions, 3GPP LTE plans to consider UE grouping. The enhancement of the MRO regarding the UE grouping issue has to be discussed.

SUMMARY OF THE INVENTION

The present invention provides a method and apparatus for transmitting user equipment (UE) group information in a wireless communication system. The present invention provides a method for transmitting a handover request message including UE group information when a source eNodeB (eNB) hands over UEs to a target eNB.

In an aspect, a method for transmitting, by a source eNodeB (eNB) of a handover procedure, user equipment (UE) group information in a wireless communication system is provided. The method includes transmitting a handover request message including UE group information to a target eNB of the handover procedure when the source eNB hands over a UE to the target eNB. The UE group information is included in a UE history information IE (information element) of the handover request message.

The UE group information may be forwarded, by the target eNB, to another target eNB of next handover procedure. The UE group information may include whether the UE is served with cell range expansion (CRE) or not in a cell of the source eNB. The UE group information may include whether the UE is moving with high speed, medium speed or low speed. The UE group information may include whether the UE is served real time (RT) traffics or not. The UE group information may include whether in-device coexistence (IDC) problems of the UE can be solved in a cell of the source eNB.

In another aspect, a source eNodeB (eNB) of a handover procedure in a wireless communication system is provided. The source eNB includes a radio frequency (RF) unit for transmitting or receiving a radio signal, and a processor coupled to the RF unit, and configured to transmit a handover request message including user equipment (UE) group information to a target eNB of the handover procedure when the source eNB hands over a UE to the target eNB. The UE group information is included in a UE history information IE (information element) of the handover request message.

In another aspect, a method for transmitting, by an eNodeB (eNB), user equipment (UE) group information in a wireless communication system is provided. The method includes transmitting UE group information indicating a group categorized when a radio link failure (RLF) has occurred during a handover procedure.

DESCRIPTION OF EXEMPLARY EMBODIMENTS

Figure 1:
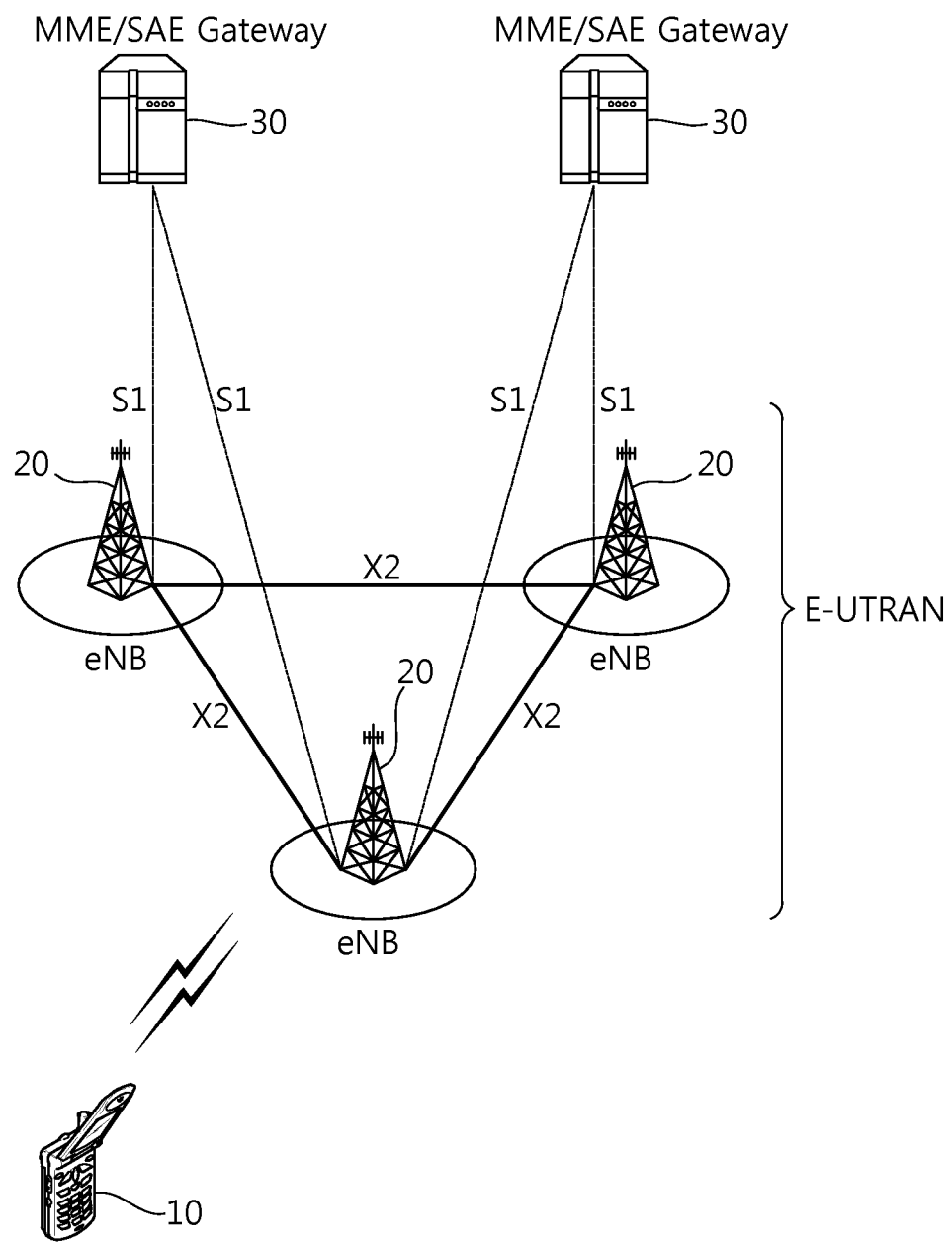
FIG. 1 shows LTE system architecture.
Figure 2:
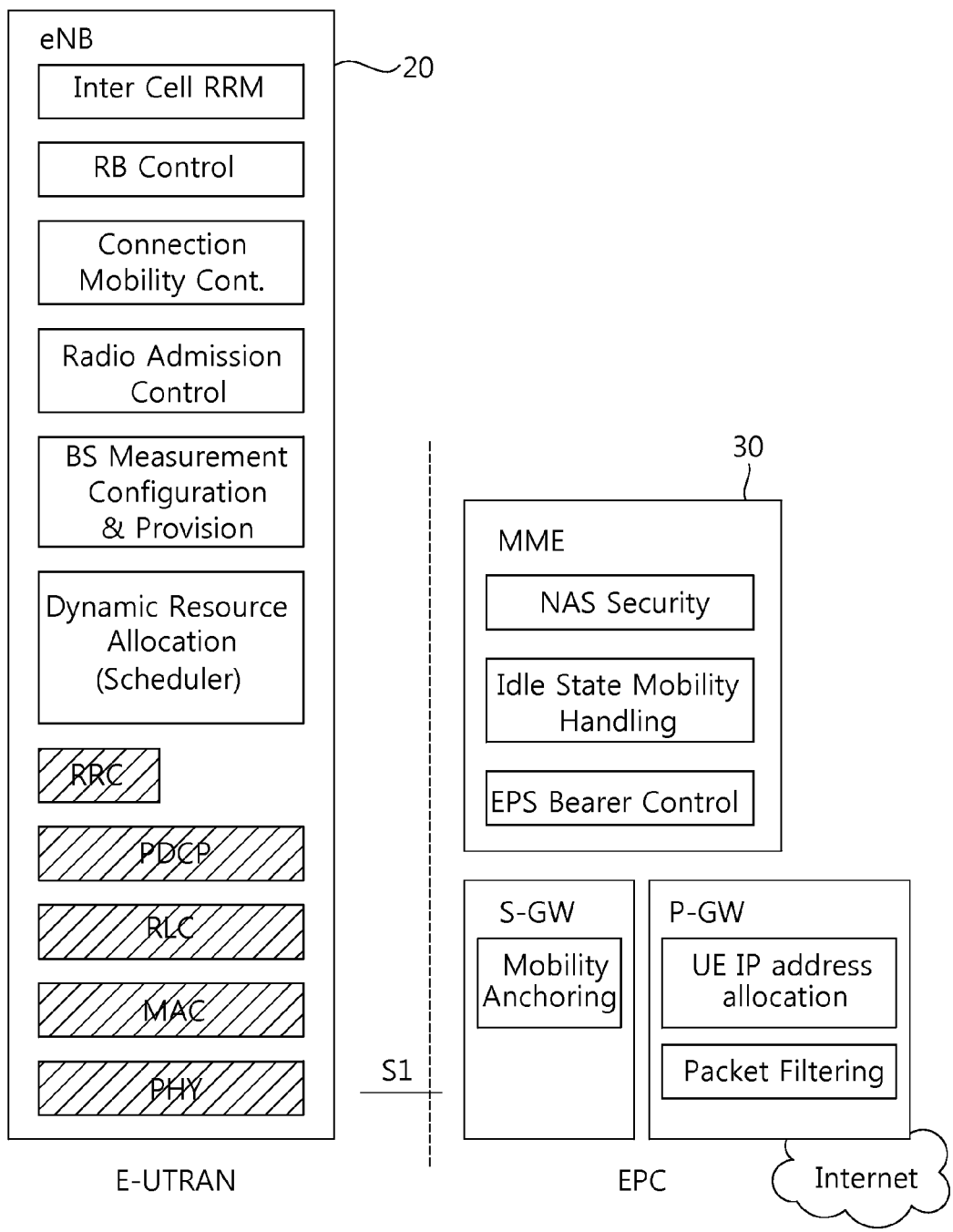
FIG. 2 shows a block diagram of architecture of a typical E-UTRAN and a typical EPC.
Figure 3:
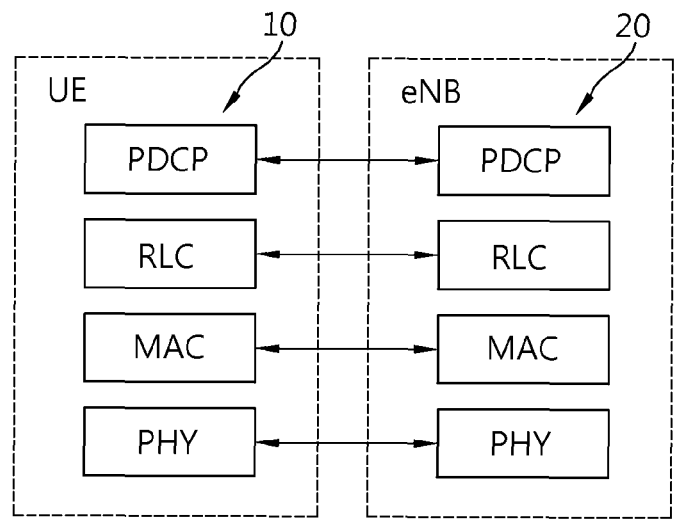
FIG. 3 shows a block diagram of a user plane protocol stack and a control plane protocol stack of an LTE system.
Figure 3:
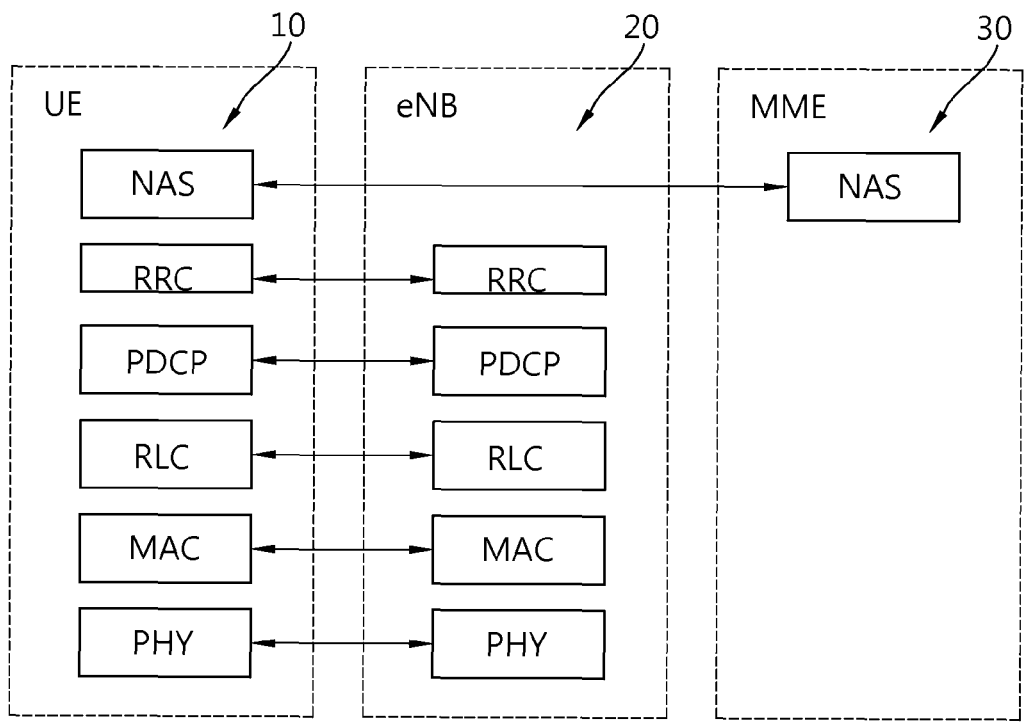
Figure 4:
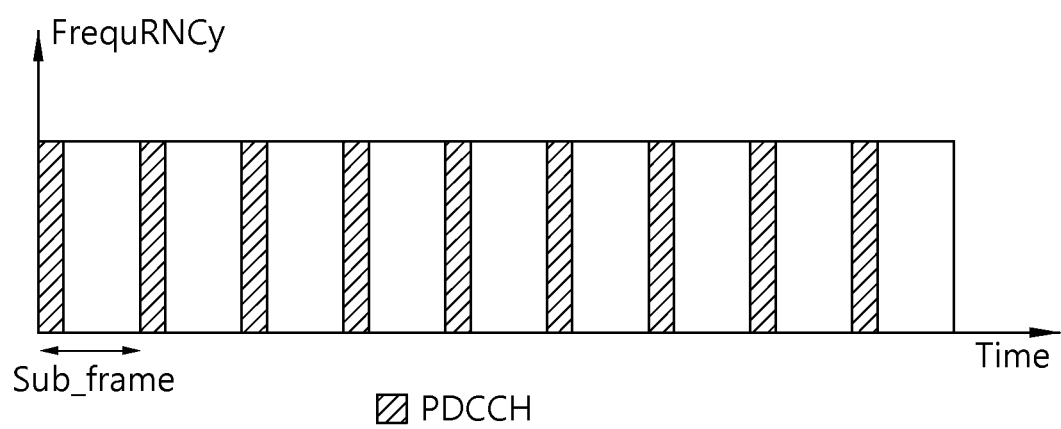
FIG. 4 shows an example of a physical channel structure.

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Handover (HO) is described. It may be referred to Section 10.1.2.1 of 3GPP TS 36.300 V11.4.0 (2012-12).

The intra E-UTRAN HO of a UE in RRC_CONNECTED state is a UE-assisted network-controlled HO, with HO preparation signaling in E-UTRAN:

Part of the HO command comes from the target eNB and is transparently forwarded to the UE by the source eNB;
To prepare the HO, the source eNB passes all necessary information to the target eNB (e.g., E-UTRAN radio access bearer (E-RAB) attributes and RRC context): When carrier aggregation (CA) is configured and to enable secondary cell (SCell) selection in the target eNB, the source eNB can provide in decreasing order of radio quality a list of the best cells and optionally measurement result of the cells.
Both the source eNB and UE keep some context (e.g., cell radio network temporary identifier (C-RNTI)) to enable the return of the UE in case of HO failure;
UE accesses the target cell via RACH following a contention-free procedure using a dedicated RACH preamble or following a contention-based procedure if dedicated RACH preambles are not available: the UE uses the dedicated preamble until the handover procedure is finished (successfully or unsuccessfully);
If the RACH procedure towards the target cell is not successful within a certain time, the UE initiates radio link failure recovery using the best cell;
No robust header compression (ROHC) context is transferred at handover.

The preparation and execution phase of the HO procedure is performed without EPC involvement, i.e., preparation messages are directly exchanged between the eNBs. The release of the resources at the source side during the HO completion phase is triggered by the eNB. In case an RN is involved, its donor eNB (DeNB) relays the appropriate S1 messages between the RN and the MME (S1-based handover) and X2 messages between the RN and target eNB (X2-based handover); the DeNB is explicitly aware of a UE attached to the RN due to the S1 proxy and X2 proxy functionality.

Figure 5:
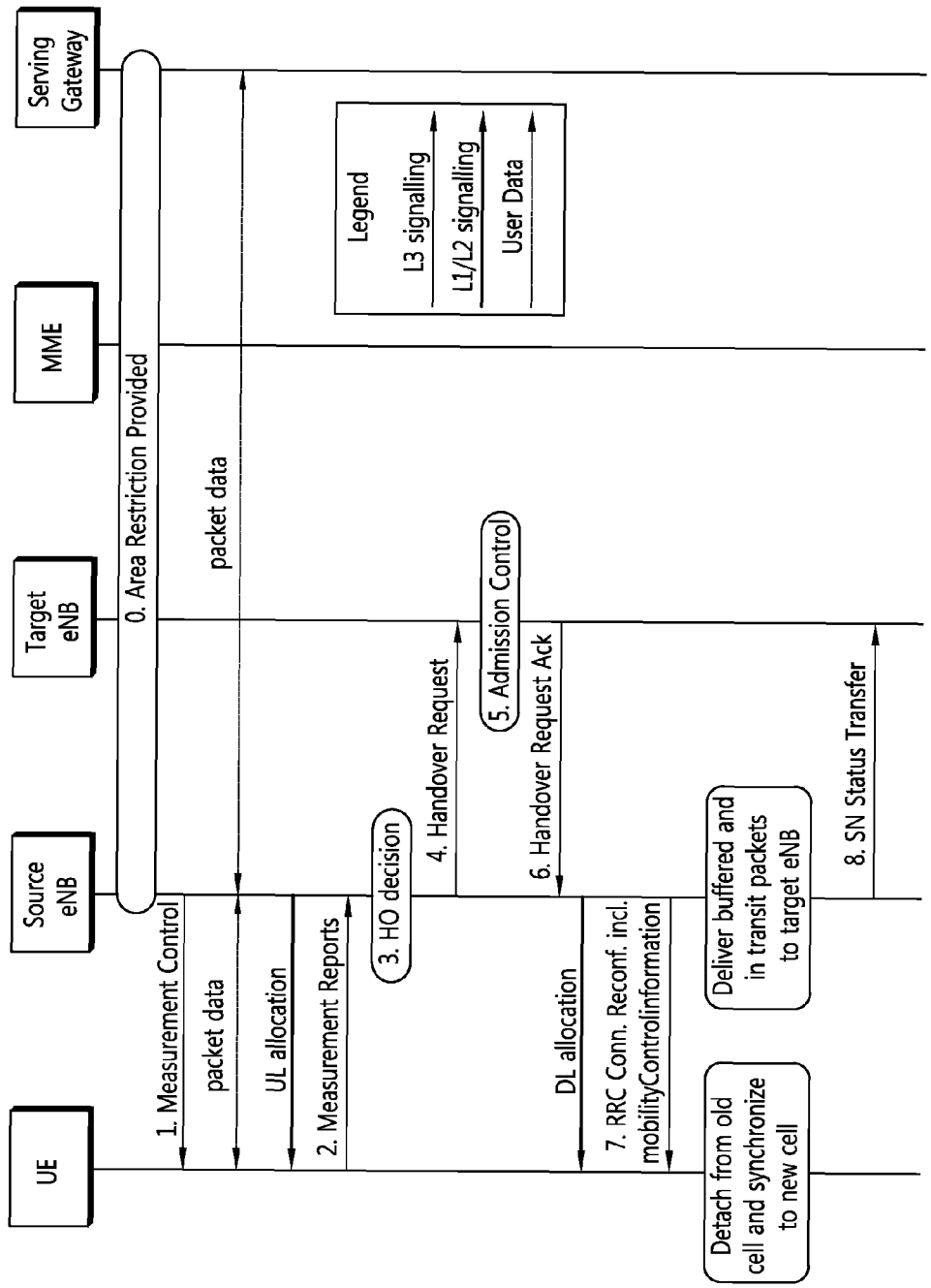
FIGS. 5 and 6 show an intra-MME/S-GW handover procedure.
Figure 6:
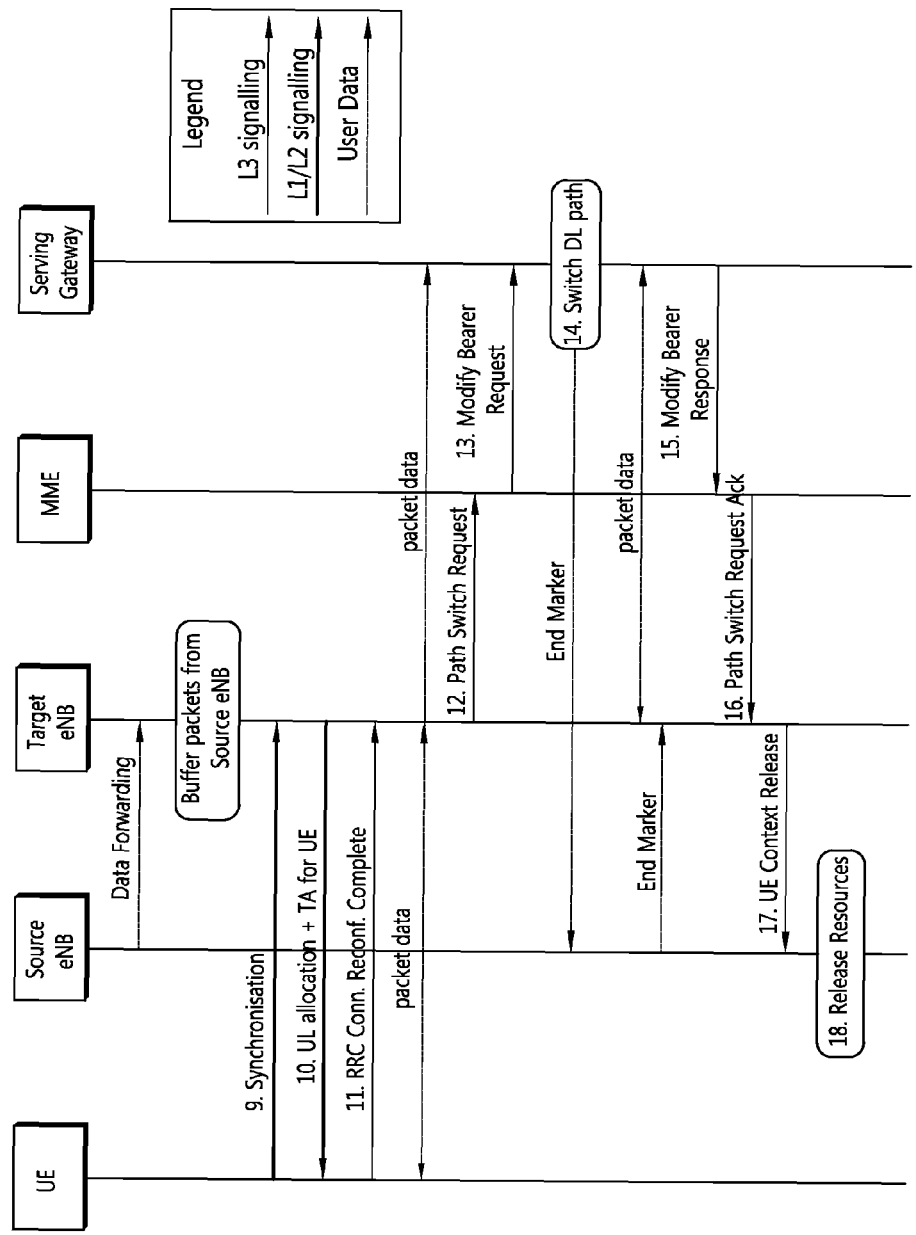

FIGS. 5 and 6 show an intra-MME/S-GW handover procedure.

0. The UE context within the source eNB contains information regarding roaming restrictions which were provided either at connection establishment or at the last timing advance (TA) update.
1. The source eNB configures the UE measurement procedures according to the area restriction information. Measurements provided by the source eNB may assist the function controlling the UE's connection mobility.

2. The UE is triggered to send measurement reports by the rules set by i.e., system information, specification, etc.

3. The source eNB makes decision based on measurement reports and radio resource management (RRM) information to hand off the UE.

4. The source eNB issues a handover request message to the target eNB passing necessary information to prepare the HO at the target side (UE X2 signalling context reference at source eNB, UE S1 EPC signalling context reference, target cell identifier (ID), $K_{eNB}*$, RRC context including the C-RNTI of the UE in the source eNB, AS-configuration, E-RAB context and physical layer ID of the source cell+ short MAC-I for possible radio link failure (RLF) recovery). UE X2/UE S1 signalling references enable the target eNB to address the source eNB and the EPC. The E-RAB context includes necessary radio network layer (RNL) and transport network layer (TNL) addressing information, and quality of service (QoS) profiles of the E-RABs.

5. Admission Control may be performed by the target eNB dependent on the received E-RAB QoS information to increase the likelihood of a successful HO, if the resources can be granted by target eNB. The target eNB configures the required resources according to the received E-RAB QoS information and reserves a C-RNTI and optionally a RACH preamble.

The AS-configuration to be used in the target cell can either be specified independently (i.e., an "establishment") or as a delta compared to the AS-configuration used in the source cell (i.e., a "reconfiguration").

6. The target eNB prepares HO with L1/L2 and sends the handover request acknowledge to the source eNB. The handover request acknowledge message includes a transparent container to be sent to the UE as an RRC message to perform the handover. The container includes a new C-RNTI, target eNB security algorithm identifiers for the selected security algorithms, may include a dedicated RACH preamble, and possibly some other parameters, i.e., access parameters, SIBs, etc. The handover request acknowledge message may also include RNL/TNL information for the forwarding tunnels, if necessary.

As soon as the source eNB receives the handover request acknowledge, or as soon as the transmission of the handover command is initiated in the downlink, data forwarding may be initiated.

Steps 7 to 16 in FIGS. 5 and 6 provide means to avoid data loss during HO.

7. The target eNB generates the RRC message to perform the handover, i.e., RRCConnectionReconfiguration message including the mobilityControlInformation, to be sent by the source eNB towards the UE. The source eNB performs the necessary integrity protection and ciphering of the message. The UE receives the RRCConnectionReconfiguration message with necessary parameters (i.e. new C-RNTI, target eNB security algorithm identifiers, and optionally dedicated RACH preamble, target eNB SIBs, etc.) and is commanded by the source eNB to perform the HO. The UE does not need to delay the handover execution for delivering the HARQ/ARQ responses to source eNB.

8. The source eNB sends the sequence number (SN) status transfer message to the target eNB to convey the uplink PDCP SN receiver status and the downlink PDCP SN transmitter status of E-RABs for which PDCP status preservation applies (i.e., for RLC AM). The uplink PDCP SN receiver status includes at least the PDCP SN of the first missing UL service data unit (SDU) and may include a bit map of the receive status of the out of sequence UL SDUs that the UE needs to retransmit in the target cell, if there are any such SDUs. The downlink PDCP SN transmitter status indicates the next PDCP SN that the target eNB shall assign to new SDUs, not having a PDCP SN yet. The source eNB may omit sending this message if none of the E-RABs of the UE shall be treated with PDCP status preservation.

9. After receiving the RRCConnectionReconfiguration message including the mobilityControlInformation, UE performs synchronization to target eNB and accesses the target cell via RACH, following a contention-free procedure if a dedicated RACH preamble was indicated in the mobilityControlInformation, or following a contention-based procedure if no dedicated preamble was indicated. UE derives target eNB specific keys and configures the selected security algorithms to be used in the target cell.

10. The target eNB responds with UL allocation and timing advance.

11. When the UE has successfully accessed the target cell, the UE sends the RRCConnectionReconfigurationComplete message (C-RNTI) to confirm the handover, along with an uplink buffer status report, whenever possible, to the target eNB to indicate that the handover procedure is completed for the UE. The target eNB verifies the C-RNTI sent in the RRCConnectionReconfigurationComplete message. The target eNB can now begin sending data to the UE.

12. The target eNB sends a path switch request message to MME to inform that the UE has changed cell.

13. The MME sends a modify bearer request message to the serving gateway.

14. The serving gateway switches the downlink data path to the target side. The Serving gateway sends one or more "end marker" packets on the old path to the source eNB and then can release any U-plane/TNL resources towards the source eNB.

15. The serving gateway sends a modify bearer response message to MME.

16. The MME confirms the path switch request message with the path switch request acknowledge message.

17. By sending the UE context release message, the target eNB informs success of HO to source eNB and triggers the release of resources by the source eNB. The target eNB sends this message after the path switch request acknowledge message is received from the MME.

18. Upon reception of the UE context release message, the source eNB can release radio and C-plane related resources associated to the UE context. Any ongoing data forwarding may continue.

A handover preparation procedure is described. It may be referred to Section 8.2.1 of 3GPP TS 36.423 V11.5.0 (2013-06). This procedure is used to establish necessary resources in an eNB for an incoming handover. The procedure uses UE-associated signaling.

Figure 7:
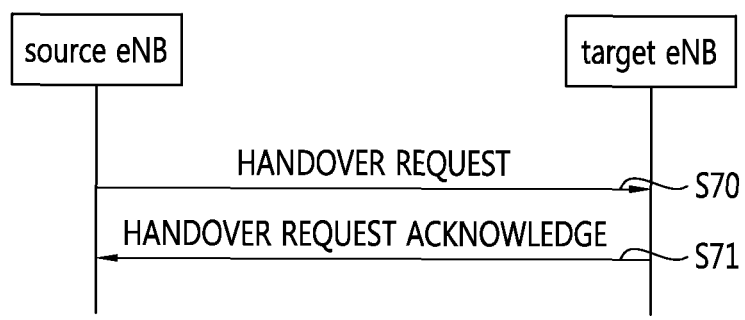
FIG. 7 shows a handover preparation procedure.

FIG. 7 shows a handover preparation procedure. In step S70, the source eNB initiates the procedure by sending the HANDOVER REQUEST message to the target eNB. When the source eNB sends the HANDOVER REQUEST message, it shall start the timer $T_{RELOCprep}$.

If at least one of the requested non-guaranteed bit rate (GBR) E-RABs is admitted to the cell indicated by the Target Cell ID IE, the target eNB shall reserve necessary resources, and in step S71, send the HANDOVER REQUEST ACKNOWLEDGE message back to the source eNB. The target eNB shall include the E-RABs for which resources have been prepared at the target cell in the E-RABs Admitted List IE. The target eNB shall include the E-RABs that have not been admitted in the E-RABs Not Admitted List IE with an appropriate cause value.

At reception of the HANDOVER REQUEST message the target eNB shall prepare the configuration of the AS security relation between the UE and the target eNB by using the information in the UE Security Capabilities IE and the AS Security Information IE in the UE Context Information IE.

For each E-RAB for which the source eNB proposes to do forwarding of downlink data, the source eNB shall include the DL Forwarding IE within the E-RABs To be Setup Item IE of the HANDOVER REQUEST message. For each E-RAB that it has decided to admit, the target eNB may include the DL GTP Tunnel Endpoint IE within the E-RABs Admitted Item IE of the HANDOVER REQUEST ACKNOWLEDGE message to indicate that it accepts the proposed forwarding of downlink data for this bearer. This GTP tunnel endpoint may be different from the corresponding GTP TEID IE in the E-RAB To Be Switched in Downlink List IE of the PATH SWITCH REQUEST message depending on implementation choice.

For each bearer in the E-RABs Admitted List IE, the target eNB may include the UL GTP Tunnel Endpoint IE to indicate that it requests data forwarding of uplink packets to be performed for that bearer.

Upon reception of the HANDOVER REQUEST ACKNOWLEDGE message the source eNB shall stop the timer $T_{RELOCprep}$, start the timer $TX2_{RELocoverall}$ and terminate the handover preparation procedure. The source eNB is then defined to have a prepared Handover for that X2 UE-associated signaling.

Upon reception of UE History Information IE in the HANDOVER REQUEST message, the target eNB shall collect the information defined as mandatory in the UE History Information IE and shall, if supported, collect the information defined as optional in the UE History Information IE, for as long as the UE stays in one of its cells, and store the collected information to be used for future handover preparations.

Table 1 shows an example of the HANDOVER REQUEST message. It may be referred to Section 9.1.1.1 of 3GPP TS 36.423 V11.5.0 (2013-06). This message is sent by the source eNB to the target eNB to request the preparation of resources for a handover.

TABLE 1

| IE/Group Name | Presence | Range | IE type and reference | Semantics description | Criticality | Assigned Criticality |
|---|---|---|---|---|---|---|
| Message Type | M | | 9.2.13 | | YES | reject |
| Old eNB UE X2AP ID | M | | eNB UE X2AP ID 9.2.24 | Allocated at the source eNB | YES | reject |
| Cause | M | | 9.2.6 | | YES | ignore |
| Target Cell ID | M | | ECGI 9.2.14 | | YES | reject |
| GUMMEI | M | | 9.2.16 | | YES | reject |
| UE Context Information | | 1 | | | YES | reject |
| >MME UE S1AP ID | M | | INTEGER (0 ... $2^{32}$-1) | MME UE S1AP ID allocated at the MME | — | — |
| >UE Security Capabilities | M | | 9.2.29 | | — | — |
| >AS Security Information | M | | 9.2.30 | | — | — |
| >UE Aggregate Maximum Bit Rate | M | | 9.2.12 | | — | — |
| >Subscriber Profile ID for RAT/Frequency priority | O | | 9.2.25 | | — | — |
| >E-RABs To Be Setup List | | 1 | | | — | — |
| >>E-RABs To Be Setup Item | | 1 ... <maxnoof Bearers> | | | EACH | ignore |
| >>>E-RAB ID | M | | 9.2.23 | | — | — |
| >>>E-RAB Level QoS Parameters | M | | 9.2.9 | Includes necessary QoS parameters | — | — |
| >>>DL Forwarding | O | | 9.2.5 | | — | — |
| >>>UL GTP Tunnel Endpoint | M | | GTP Tunnel Endpoint 9.2.1 | SGW endpoint of the S1 transport bearer. For delivery of ULPDUs. | — | — |
| >RRC Context | M | | OCTET STRING | Includes the RRC Handover Preparation Information message as defined in subclause 10.2.2 of TS 36.331 [9] | — | — |
| >Handover Restriction List | O | | 9.2.3 | | — | — |

TABLE 1-continued

| IE/Group Name | Presence | Range | IE type and reference | Semantics description | Criticality | Assigned Criticality |
|---|---|---|---|---|---|---|
| >Location Reporting Information | O | | 9.2.21 | Includes the necessary parameters for location reporting | — | — |
| >Management Based MDT Allowed | O | | 9.2.59 | | YES | ignore |
| >Management Based MDT PLMN List | O | | MDT PLMN List 9.2.64 | | YES | ignore |
| UE History Information | M | | 9.2.38 | Same definition as in TS 36.413 [4] | YES | ignore |
| Trace Activation | O | | 9.2.2 | | YES | ignore |
| SRVCC Operation Possible | O | | 9.2.33 | | YES | ignore |
| CSG Membership Status | O | | 9.2.52 | | YES | reject |
| Mobility Information | O | | BIT STRING (SIZE (32)) | Information related to the handover; the source eNB provides it in order to enable later analysis of the conditions that led to a wrong HO. | YES | ignore |

Referring to Table 1, the HANDOVER REQUEST message includes the UE History Information IE as mandatory.

Table 2 shows an example of the UE History Information IE. It may be referred to Section 9.2.38 of 3GPP TS 36.423 V11.5.0 (2013-06). The UE History Information IE contains information about cells that a UE has been served by in active state prior to the target cell.

TABLE 2

| IE/Group Name | Presence | Range | IE type and reference | Semantics description | Criticality | Assigned Criticality |
|---|---|---|---|---|---|---|
| Last Visited Cell List | | 1 ... <maxnoofCells> | | Most recent information is added to the top of this list | — | — |
| >Last Visited Cell Information | M | | 9.2.39 | | — | — |

Mobility setting change procedure is described. It may be referred to Section 8.3.8 of 3GPP TS 36.423 V11.5.0 (2013-06). This procedure enables an eNB to negotiate the handover trigger settings with a peer eNB controlling neighboring cells. The procedure uses non UE-associated signaling.

Figure 8:
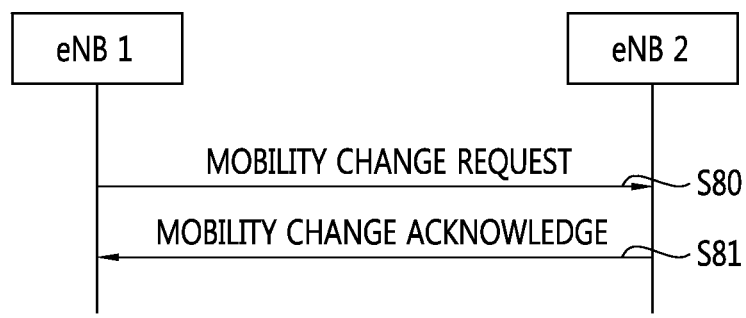
FIG. 8 shows a mobility setting change procedure.

FIG. 8 shows a mobility setting change procedure. In step S80, the procedure is initiated with a MOBILITY CHANGE REQUEST message sent from the eNB1 to the eNB2. Upon receipt, the eNB2 shall evaluate if the proposed eNB2 handover trigger modification may be accepted. If the eNB2 is able to successfully complete the request, in step S81, it shall reply with a MOBILITY CHANGE ACKNOWLEDGE message.

In order to improve mobility load balancing (MLB) and mobility robustness optimization (MRO) functions, the 3GPP LTE plans to consider UE grouping. The following scenarios have been discussed regarding the UE grouping issue.

According to current specifications, differentiation of mobility settings is possible. The objective of the "SON for UE types" task should be to evaluate if differentiation of mobility settings mechanisms can cause interoperability issue. If differentiation of mobility settings mechanisms causes interoperability issue, solutions for them has to be evaluated. Any solution should bring sufficient improvements to inter vendor interoperability and it should be robust. Such solutions should not unnecessarily limit the flexibility available in current systems for assigning different policies to UEs or UE groups.

Enabling wider differentiation of mobility setting may be needed in the system (homogeneous and heterogeneous scenarios), but may create issues, such as ping-pong event. Example scenarios of the ping-pong event are described as follows. When load balancing is used to resolve congestion in the source cell, and the mobility settings change procedure is used to adapt the handover trigger point to the target cell, some UE categories may be subject to ping-pong depending on how the UE category is handled in the target cell. A UE belonging to such UE category is handed over from the congested source cell to the target cell while located far out in the edge of the target cell. While the eNB serving the target cell is aware that handing over the UE back to the congested cell within a certain time window causes a ping pong event, whether the eNB serving the target cell needs additional information for further handover decisions has not yet defined. These decisions are typically based on a trade-off between the risk for failure and ping-pong event.

Meanwhile, the way the mobility setting change procedure is defined allows for very different implementations, and such different implementations may reduce the available range for the negotiation. To depict it, the following example may be considered. It is assumed that there are two eNBs, which are eNB A, whose vendor considers the procedure as "advisory" and relies on its implementation, and eNB B where the procedure is considered binding and where the mobility decisions are made according to the agreed mobility settings. If the two eNBs are to negotiate the mobility setting, the eNB A may propose rather big changes, assuming that if there is a UE that cannot handle such a big extensions, the mobility implementation will hand over the UE sooner. Despite the fact that the specifications do not mandate to apply the negotiated handover to all UEs, the eNB B may reject such a request because some of its served UEs may not be able to handle it. And, since the standard states that eNB A should consider the response before executing the planned change, the available range for the load balancing may be reduced.

Considering the scenarios described above, ping-pong detection and link failure (or handover failure) detection can be a problem. That is, while the source eNB distinguishes UEs of each group and manages them differently (e.g., adopting different handover parameters for different group of UEs), the source eNB cannot recognize the group of the UEs concerned when it detects ping-pong and link failure (or handover failure) problems of UEs. Therefore, the source eNB is not able to decide the UE group which needs to be modified managing strategies (such as handover parameters).

In order to solve the problems described above, a method for transmitting UE group information according to an embodiment of the present invention is described. At first, a solution for ping-pong problem is described. In the ping-pong problem, shortly after the UE is handed over from eNB1's cell 1 to eNB2's cell 2, the UE is handed over to eNB1's cell 1. In order to make the eNB1 recognize the group of UE concerned when it detects the ping-pong problem of the UE, a method for transmitting UE group information according to an embodiment of the present invention may be proposed.

Figure 9:
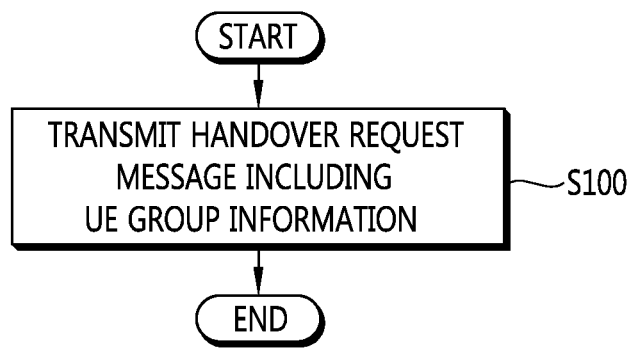
FIG. 9 shows an example of a method for transmitting UE group information according to an embodiment of the present invention.

FIG. 9 shows an example of a method for transmitting UE group information according to an embodiment of the present invention. In step S100, the source eNB transmits the HANDOVER REQUEST message including UE group information to the target eNB when the source eNB hands over the UE to the target eNB. The UE group information may be included in the UE History Information IE of the HANDOVER REQUEST message. The HANDOVER REQUEST message may be referred to Table 1 described above. The UE History Information IE may be referred to Table 2 described above. The UE group information may be forwarded to another target eNB of next handover procedure by the current target eNB.

The UE group information may contain the following information about each concerned UE.

Whether the UE is served with cell range expansion (CRE) or not in the source cell when the UE is handed over from the source cell to the target cell Whether the UE is moving with high speed, medium speed or low speed when the UE is handed over from the source cell to the target cell (or, whether the UE was moving with high speed or low speed when the UE is handed over from the source cell to the target cell)

Whether the UE is served real time (RT) traffics or not when the UE is handed over from the source cell to the target cell Whether in-device coexistence (IDC) problems of the UE can be solved in the source cell or not when the UE is handed over from the source cell to the target cell Hereinafter, a solution for link failure (or handover failure) problem is described. One of the functions of MRO is to detect connection failures that occur due to "Too early handover" or "Too late handover", or "Handover to wrong cell". These problems are defined as follows:

Too early handover: An radio link failure (RLF) occurs shortly after a successful handover from a source cell to a target cell or a handover failure occurs during the handover procedure. The UE attempts to re-establish the radio link connection in the source cell.

Too late handover: An RLF occurs after the UE has stayed for a long period of time in the cell. The UE attempts to re-establish the radio link connection in a different cell.

Handover to wrong cell: An RLF occurs shortly after a successful handover from a source cell to a target cell or a handover failure occurs during the handover procedure. The UE attempts to re-establish the radio link connection in a cell other than the source cell and the target cell.

For three RLF cases, in order to make the source eNB recognize the group of UE concerned when it detects the RLF problem of UE, a method for transmitting UE group information according to an embodiment of the present invention may be proposed.

According to an embodiment of the present invention, the source eNB may include UE group information in the HANDOVER REQUEST message when the source eNB hands over the UE to the target eNB.

Alternatively, the UE may include UE group information in the RLF report message. In this case, the UE group information may indicate the group categorized when the UE was handed over from the source eNB.

Alternatively, the eNB that the UE reestablishes or establishes after RLF event includes UE group information in the RLF INDICATION message which is sent to the eNB that RLF occurred. In this case, the UE group information may indicate the group categorized when the UE was handed over from the source eNB.

Alternatively, the eNB that UE's RLF occurred includes UE group information in the HANDOVER REPORT message which is sent to the source eNB. In this case, the UE group information may indicate the group categorized when the UE was handed over from the source eNB.

The UE group information may contain the following information about each concerned UE.

Whether the UE is served with CRE or not in the source cell when the UE is handed over from the source cell to the target cell Whether the UE is moving with high speed, medium speed or low speed when the UE is handed over from the source cell to the target cell (or, whether the UE was moving with high speed or low speed when the UE is handed over from the source cell to the target cell)

Figure 10:
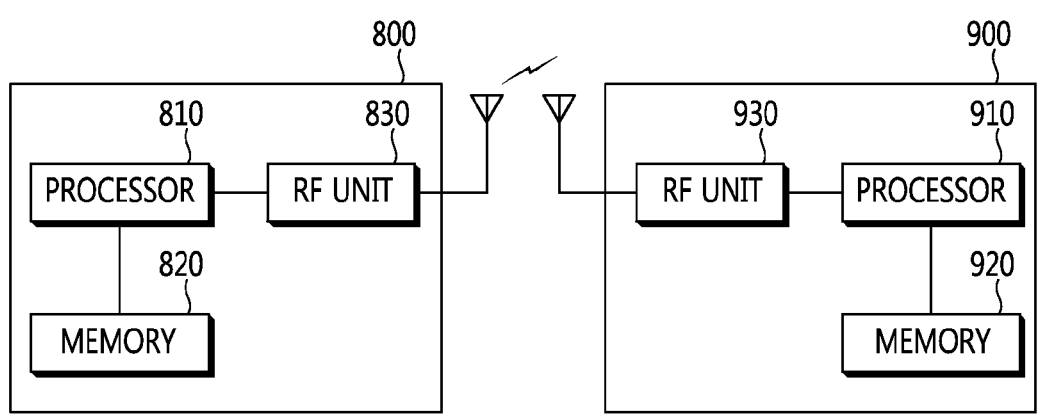
FIG. 10 shows a wireless communication system to implement an embodiment of the present invention.

Whether the UE is served RT traffics or not when the UE is handed over from the source cell to the target cell Whether IDC problems of the UE can be solved in the source cell or not when the UE is handed over from the source cell to the target cell FIG. 10 shows a wireless communication system to implement an embodiment of the present invention.

A source eNB 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A target eNB 900 includes a processor 910, a memory 920 and an RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to the present invention, the source eNB can recognize the group of the UE concerned when the source eNB detects the ping-pong problem or link failure (or handover failure) problem of UE.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting, by a source eNodeB (eNB) of a handover procedure, user equipment (UE) group information in a wireless communication system, the method comprising:
   determining whether a ping-pong event is detected during the handover procedure,
   wherein the ping-pong event specifies that a UE is handed over from a target eNB to the source eNB, after the UE is handed over from the source eNB to the target eNB;
   if the ping-pong event is detected, transmitting a handover request message including the UE group information indicating a group, to which UEs concerned with the ping-pong event belong, to the target eNB,
   wherein the UE group information is included in a UE history information IE (information element) of the handover request message,
   wherein the UE group information indicates the group of the UEs to be applied different handover parameters during the handover procedure to avoid the ping-pong event between the source eNB and the target eNB.

2. The method of claim 1, wherein the UE group information is forwarded, by the target eNB, to another target eNB of next handover procedure.

3. The method of claim 1, wherein the UE group information includes whether the UE is served with cell range expansion (CRE) or not in a cell of the source eNB.

4. The method of claim 1, wherein the UE group information includes whether the UE is moving with high speed, medium speed or low speed.

5. The method of claim 1, wherein the UE group information includes whether the UE is served real time (RT) traffics or not.

6. The method of claim 1, wherein the UE group information includes whether in-device coexistence (IDC) problems of the UE can be solved in a cell of the source eNB.

7. A source eNodeB (eNB) of a handover procedure in a wireless communication system, the source eNB comprising:
   a radio frequency (RF) unit for transmitting or receiving a radio signal; and
   a processor coupled to the RF unit, and configured to:
   determine whether a ping-pong event is detected during the handover procedure,
   wherein the ping-pong event specifies that a user equipment (UE) is handed over from a target eNB to the source eNB, after the UE is handed over from the source eNB to the target eNB;
   if the ping-pong event is detected, transmit a handover request message including user equipment (UE) group information indicating a group, to which UEs concerned with the ping-pong event belong, to the target eNB,
   wherein the UE group information is included in a UE history information IE (information element) of the handover request message,
   wherein the UE group information indicates the group of the UEs to be applied different handover parameters during the handover procedure to avoid the ping-pong event between the source eNB and the target eNB.

8. The source eNB of claim 7, wherein the UE group information is forwarded, by the target eNB, to another target eNB of next handover procedure.

9. The source eNB of claim 7, wherein the UE group information includes whether the UE is served with cell range expansion (CRE) or not in a cell of the source eNB.

10. The source eNB of claim 7, wherein the UE group information includes whether the UE is moving with high speed, medium speed or low speed.

11. The source eNB of claim 7, wherein the UE group information includes whether the UE is served real time (RT) traffics or not.

12. The source eNB of claim 7, wherein the UE group information includes whether in-device coexistence (IDC) problems of the UE can be solved in a cell of the source eNB.

13. A method for transmitting, by an eNodeB (eNB), user equipment (UE) group information in a wireless communication system, the method comprising:
   determining whether a Radio Link Failure (RLF) is detected during a handover procedure,
   wherein the RLF occurs when the handover procedure occurs at a wrong time or when the handover procedure is a handoff to a wrong cell;
   if the RLF is detected, transmitting the UE group information indicating a group, to which UEs concerned with the RLF belong, to a target eNB of the handover procedure,
   wherein the UEs concerned with the RLF are categorized by handling in the target eNB,
   wherein the UE group information indicates the group of the UEs to be applied different handover parameters during the handover procedure to avoid the RLF with the target eNB.

14. The method of claim 13, wherein the UE group information is included in an RLF indication message.

15. The method of claim 14, wherein the eNB is an eNB that the UE reestablishes after the RLF has occurred.

16. The method of claim 13, wherein the UE group information is included in a handover report message.

17. The method of claim 16, wherein the eNB is an eNB that the RLF has occurred.

* * * * *